Dec. 15, 1936.  A. GOTHE ET AL  2,064,204
BROADCAST ANTENNA
Filed Feb. 14, 1934   2 Sheets-Sheet 1

INVENTORS
ALBRECHT GOTHE
HANS OTTO ROOSENSTEIN
BY
ATTORNEY

Dec. 15, 1936.  A. GOTHE ET AL  2,064,204
BROADCAST ANTENNA
Filed Feb. 14, 1934   2 Sheets-Sheet 2

INVENTORS
ALBRECHT GOTHE
HANS OTTO ROOSENSTEIN
BY
ATTORNEY

Patented Dec. 15, 1936

2,064,204

UNITED STATES PATENT OFFICE 2,064,204

BROADCAST ANTENNA

Albrecht Gothe and Hans Otto Roosenstein, Berlin, Germany, assignors to Telefunken Gesellschaft für Drahtlose Telegraphie m. b. H., Berlin, Germany, a corporation of Germany Application February 14, 1934, Serial No. 711,085
In Germany January 26, 1933

5 Claims. (Cl. 250—33)

The present invention discloses ways and means whereby a substantial improvement of the vertical radiation diagram of an antenna combination is insured by the combination of constituent or individual radiators upon the surface of rotation bodies which differ from the purely cylindrical shape and which may be cone-shaped or even curved or arcuate.

Figure 1:
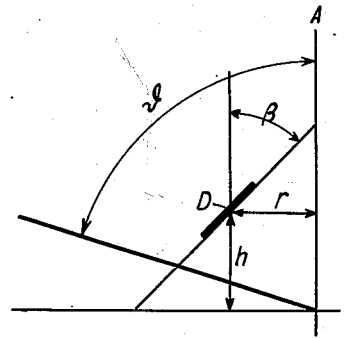
Figure 5:
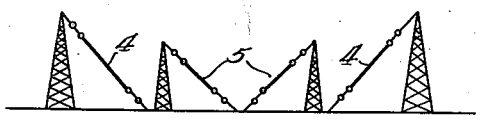
Figure 6:
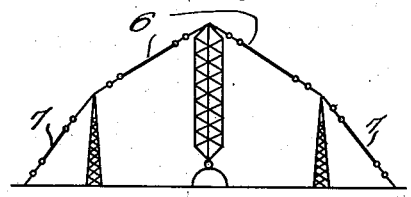
Figure 5A:
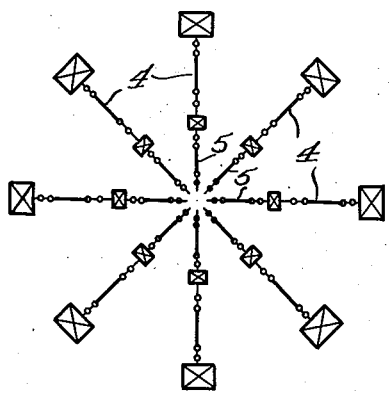
Figure 6A:
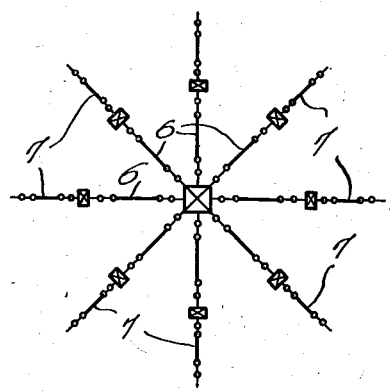
Figure 3:
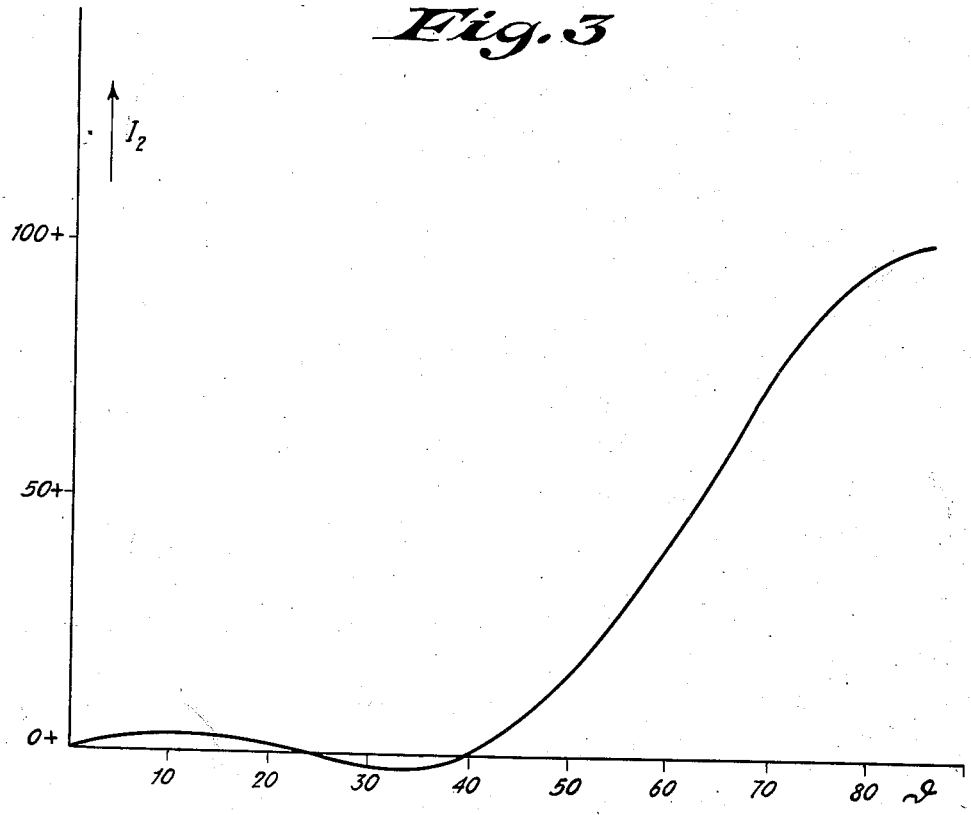

Fig. 1 shows vectors and angles explanatory of the operation of the invention;

Figs. 2, 4, 5, and 6 show antenna structures embodying the principles of the invention;

Fig. 3 is a radiation diagram obtained by an antenna in accordance with the invention; and Figs. 5a and 6a, respectively, are plan views of the structures of Figs. 5 and 6.

Calculating the radiation diagram of a body of revolution which is produced when a sloped Hertzian dipole D (Fig. 1) presenting an angle of inclination $\beta$ in reference to the perpendicular is turned about a vertical axis A located in its plane, there results the following formula:

$$E\theta = C \ [\sin \theta \cos \beta . \cos (a \cos \theta) .$$
$$J_0 \ (\rho . \sin \theta) - \cos \theta \sin \beta \sin (a \cos \theta) .$$
$$J \ (\rho . \sin \theta)] \quad (1)$$

where $C$ is a constant dependent upon the length of the dipole D, the total current flowing in the entire cone, and the distance from the antenna structure to the remote point at which the radiated field given by Equation (1) is measured; $\theta$=the angle measured from the zenith of the antenna to the infinitely far space point to which the amplitude of the radiation vector refers;

$$a = \frac{2\pi h}{\lambda} =$$

height $h$ of the dipole above ground in angular measure;

$$\rho = \frac{2\pi r}{\lambda} =$$

the distance $r$ of the dipole from the axis of rotation in angular measure;

$J_0$ and $J_1$ Bessel functions of the 0 and the 1st order.

The derivation of Equation (1) is rather tedious and involves a considerable number of equations, but a statement of the method by which the equation is derived will now be given. The problem is to determine the field at a remote point from an antenna structure consisting ideally of a truncated conical surface which may be considered as composed of a large number of current elements such as D of Fig. 1. It is assumed that the length of the current element is small compared to a wavelength and that the current is uniform throughout the length of the element, and that the currents are identical in all the elements. First, it will be noted that on account of the symmetry of the conical arrangements the radiated field will be the same in any direction in the horizontal plane. Therefore it is necessary only to calculate the radiation in any one horizontal direction for all values of the angle $\theta$ between the vertical and the line from the antenna structure to the remote point at which the radiation is to be evaluated. The first step in the calculation is to consider the effect of four elementary dipoles located symmetrically, two on either side of the horizontal direction from the center of the antenna to the remote point. The two dipoles on one side of this direction are located as images of the two on the other side and this image symmetry also holds about the direction through the antenna at right angles to the direction to the remote point. In other words, if one of the elementary dipoles subtends at the center of the cone, an angle F with the vertical plane through the center of the antenna and the remote point, then another elementary dipole will subtend angle $-F$ while the remaining two will subtend angles pi+F and pi−F. Now let each of these four dipoles be replaced by their vertical and horizontal components. The field from the two vertical components equidistant from the remote point is obviously twice the field from either one and is readily calculated from elementary formulae for radiation from a simple dipole. The field from the vertical components that are more remote is similarly calculated but due to the greater distance this second field arrives at the remote point with a phase lag so that the effective field at the remote point is shifted in phase with respect to the phase of the field arriving from the nearer doublets. The magnitude of the resulting field, as well as its phase are readily calculated by elementary methods of vectorial addition. This resulting field is due to four current elements so that the total field from the entire current sheet will be the integral obtained with respect to the angle F between the limits zero and one-half pi, since within these limits the four current elements occupy every position in the current sheet. This integration is carried out in the terms of the Bessel function of zero order $(J_0)$ and gives the total effect at the remote point of the field from the vertical component of the conical current sheet. However, if the antenna is suspended above a perfectly conducting earth, there exists a mirror image an equal distance below the surface of the earth and this produces a similar field at the remote point, except that due to the greater distance from the image its field lags in phase so that the combination of the direct and image fields involves a further shift in phase and alteration of amplitude which again may be readily determined by vector addition. This last result gives us the field at the remote point due to the vertical component of the whole current sheet together with the effect of its mirror image.

Figure 2:
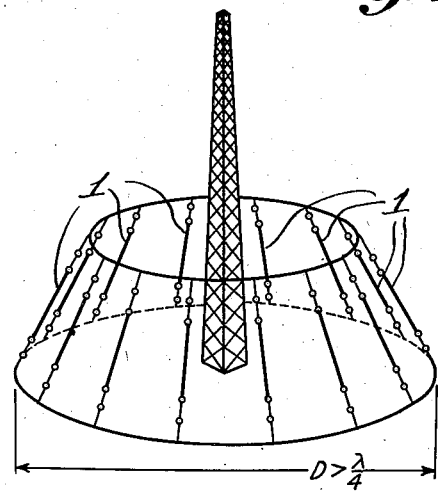

We now take up the calculation of the field from the horizontal component of the current sheet. Each horizontal component may be further decomposed into a component in the direction of the remote point and a component at right angles thereto. It will be seen from symmetry that the effects of all the latter components cancel out. The effect of the horizontal components may then be calculated by a series of steps corresponding to the steps outlined in connection with the calculations of the vertical components, finally arriving at an expression for the field at the remote point due to the horizontal component of the entire current sheet together with its mirror image. In the course of these calculations, if careful account is taken of the phases of the final fields due to the vertical and horizontal components, it will be found that these phases are in opposition when the small end of the cone is upward as shown in Fig. 2. For this reason we have the minus sign between the two parts of the expression in Equation (1), the first part corresponding to the effect of the vertical component and the second part having to do with the effect of the horizontal component.

Now referring again to the final Equation (1), it will be seen that for $\beta=0$ degrees there results the radiation diagram for a vertical dipole cylinder, while for $\beta=90$ degrees there results the radiation diagram of a ring of horizontal radial dipoles. For intermediate values one obtains radiation diagrams of a conical zone having one-half of the opening angle $\beta$. An evaluation of Equation (1) shows that for the values 90 degrees$=\beta=0$ there result particularly favorable forms of radiation diagram whenever the maximum diameter of the ensuing cone zones is greater than one-quarter wavelength. (Fig. 2.)

Hence, according to this invention, the different radiant parts are arranged upon one or more zones or cones, spheres or other bodies of rotation whose surfaces are essentially inclined in reference to the vertical line. An evaluation of the formula, for instance, shows that a simple conical zone having the diameter $2r=0.9\lambda$ and one half the opening angle $\beta=17$ degrees at a height equal to $h=\lambda/5$ above ground results in a radiation diagram as shown in Fig. 3 and which has the property of hardly radiating in angles from 0 to 45 degrees from the perpendicular, a fact and result that is unattainable with broadcast antennae of the kind heretofore known. The dipoles of Fig. 2 are indicated by the reference character 1; those of Fig. 4 by the reference characters 2 and 3; those of Fig. 5 by the characters 4 and 5; and those of Fig. 6 by the characters 6 and 7.

Figure 4:
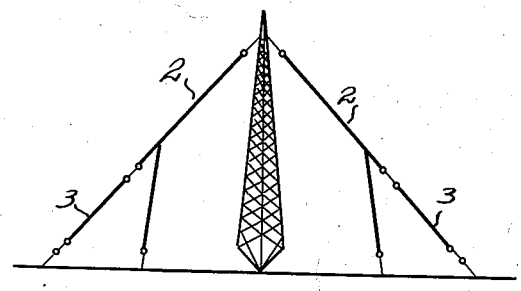

The identical effect is obtainable if two or more conical zones are covered with dipoles so that the radiations of these two zones will combine (see Figs. 4 and 5). Under certain circumstances a structure that is of greater simplicity from a technical viewpoint is obtained if in such a structure comprising one or more conical zones there is incorporated one of the known central radiators, say, a vertical antenna in the axis of the zone. (Fig. 6.)

An examination of Formula (1) shows, furthermore, that a conical zone with a given height above ground and a given radius can always be given such an inclination of the various dipoles above ground that in a definite direction from the vertical there ensues a zero point in the radiation diagram. Disposing a plurality of such conical zones above one another there results a body of rotation with a curved surface. Now, of this body each individual zone possesses the property of not radiating in the said direction. As a result, the whole body is endowed with this quality regardless of the distributions of current which are incidentally possible, provided that the current lines extend all on the meridians of the body. Such an antenna formed as a body, particularly in the case of ultra-short waves, offers the merit that the zero zone is not determined by the controllable current distribution, but solely by the shape of the body.

Where relatively long waves are dealt with, it is often difficult to make such bodies from solid material or from plates or sheets. An attempt must be made to obtain the theoretically ideal form by choosing a gauze or wire network. Generally speaking, it is necessary for this purpose that at least six different wires be located upon the circumference of the circle. The construction of an antenna as here disclosed is not confined to antennae which are grounded.

We claim:

1. A broadcast antenna for producing substantially uniform and maximum radiation in a horizontal plane comprising a plurality of separate radiating elements inclined with respect to the vertical and lying in a surface of revolution, there being at least six radiating elements, the maximum diameter of said surface of revolution being greater than one-quarter of the length of the communication wave.

2. A broadcast antenna for producing substantially uniform and maximum radiation in a horizontal plane comprising a plurality of separate radiating elements, at least six, each of which forms an acute angle with respect to the vertical, said elements lying in the surface of a cone, the maximum diameter of said cone being greater than one-quarter the length of the communication wave, and a radiating element in the axis of said cone.

3. An antenna suitable for radio broadcasting comprising a plurality of radiating elements inclined with respect to the vertical and located in a surface formed by a body of rotation, the maximum diameter of said body of rotation being greater than one-quarter of the length of the communication wave, and another group of radiating elements disposed on the surface formed by another body of rotation, both said bodies of rotation having the same axis.

4. An antenna for producing substantially uniform and maximum radiation in the horizontal plane and zero radiation at one or more angles between the horizontal and the vertical plane comprising a plurality of separate conductors arranged to lie in a surface of revolution all points of which are substantially inclined to the vertical, whose maximum diameter is greater than one-quarter the length of the communication wave, the number of said conductors being at least six whereby the resulting radiation is substantially the same in its distribution as that which would result from a continuous current sheet in said surface of revolution, and the dimensions, geometry, and height above ground of said antenna elements being so related as to produce a relatively small total radiation at high angles above the ground.

5. An antenna for producing substantially uniform and maximum radiation in the horizontal plane and very little radiation at angles between the vertical and 45° from the vertical comprising at least six separate conductors lying uniformly distributed about a surface of revolution, all points of which are substantially inclined to the vertical, to simulate a continuous current sheet in said surface, the size, geometry and height above ground of said conductors being so related that each zone of said current sheet lying between horizontal sections thereof produces little vertical radiation, whereby the total radiation of all of said zones in the vertical direction between said angles is small, regardless of the relative distribution of currents in said zones, the maximum diameter of said antenna being not less than one-quarter of the length of the communication wave.

ALBRECHT GOTHE.
HANS OTTO ROOSENSTEIN.